United States Patent
Nakajima

[19]
[11] Patent Number: 6,062,190
[45] Date of Patent: May 16, 2000

[54] IGNITION TIMING CONTROL APPARATUS AND METHOD FOR INTERNAL COMBUSTION ENGINE

[75] Inventor: Yuki Nakajima, Yokohama, Japan

[73] Assignee: Nissan Motor Co., Ltd., Yokohama, Japan

[21] Appl. No.: 09/116,949

[22] Filed: Jul. 17, 1998

[30] Foreign Application Priority Data

Jul. 18, 1997 [JP] Japan ........................ 9-194610

[51] Int. Cl.$^7$ .................. F02B 17/00; F02P 5/15
[52] U.S. Cl. ................ 123/295; 123/305; 123/406.47
[58] Field of Search ................ 123/295, 305, 123/406.47

[56] References Cited

U.S. PATENT DOCUMENTS

| | | | |
|---|---|---|---|
| 5,078,107 | 1/1992 | Morikawa | 123/295 |
| 5,875,756 | 3/1999 | Kamura et al. | 123/295 |
| 5,937,822 | 8/1999 | Nakajima | 123/295 |
| 5,992,372 | 11/1999 | Nakajima | 123/295 |

FOREIGN PATENT DOCUMENTS 59-37236 2/1984 Japan .
3-281965 12/1991 Japan .

*Primary Examiner*—Tony M. Argenbright
*Attorney, Agent, or Firm*—Foley & Lardner

[57] ABSTRACT

In ignition timing control apparatus and method for an internal combustion engine which carries out a switching of a combustion mode between a stratified charge combustion and a homogeneous charge combustion according to an engine driving condition, an ignition timing value in the mode of the stratified charge combustion during a transfer of a switching of the combustion mode between the stratified charge combustion and the homogeneous charge combustion is generated using both of at least one first ignition timing map used when the combustion mode of the engine is in a steady state of the stratified charge combustion and a second ignition timing map carried out at a rich limit of an air-fuel mixture ratio and which is used at a switching point between the stratified charge combustion and the homogeneous charge combustion, for example, through an interpolation based on a variation rate in a status variable of an air-fuel mixture supplied into each cylinder.

20 Claims, 8 Drawing Sheets

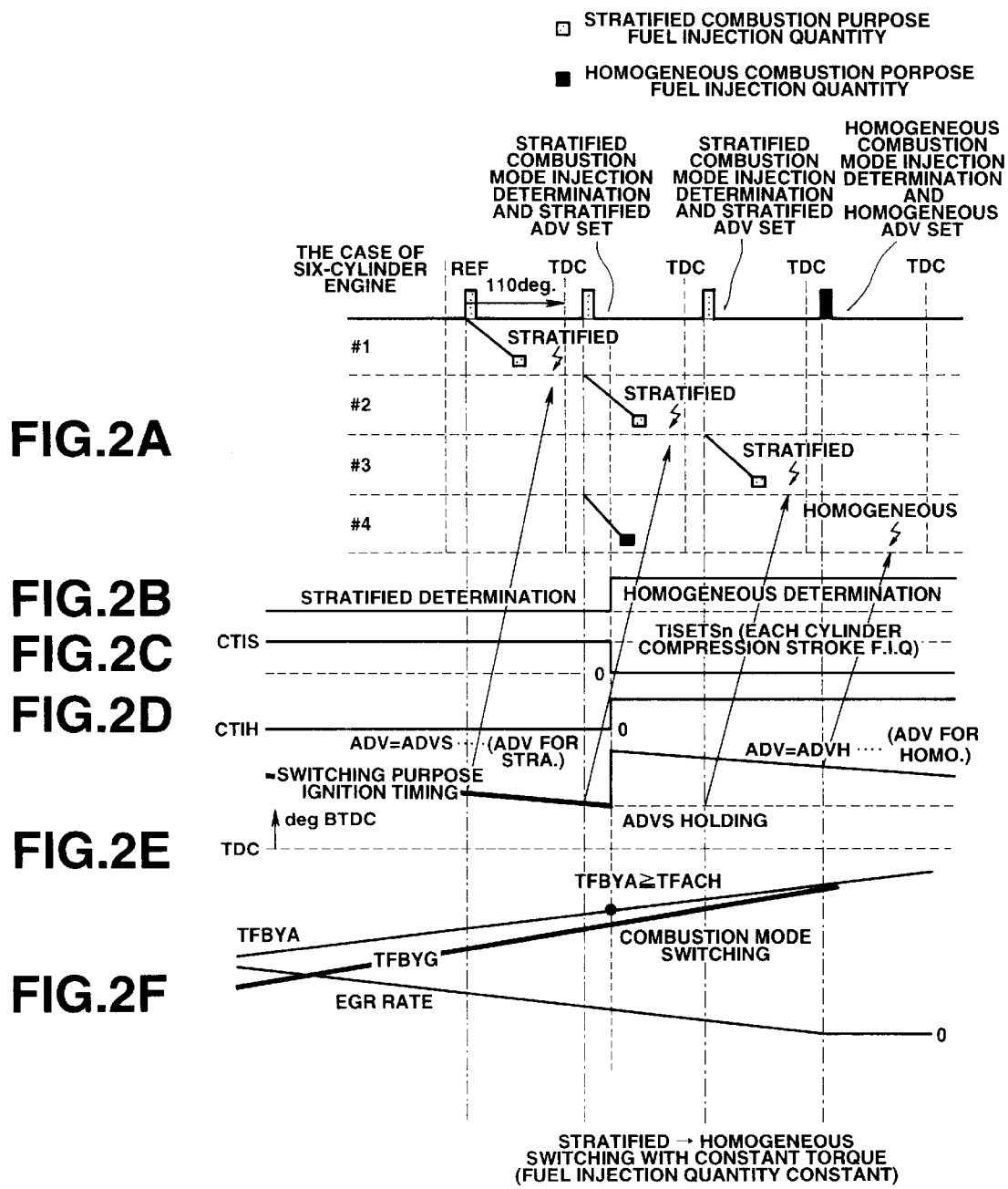

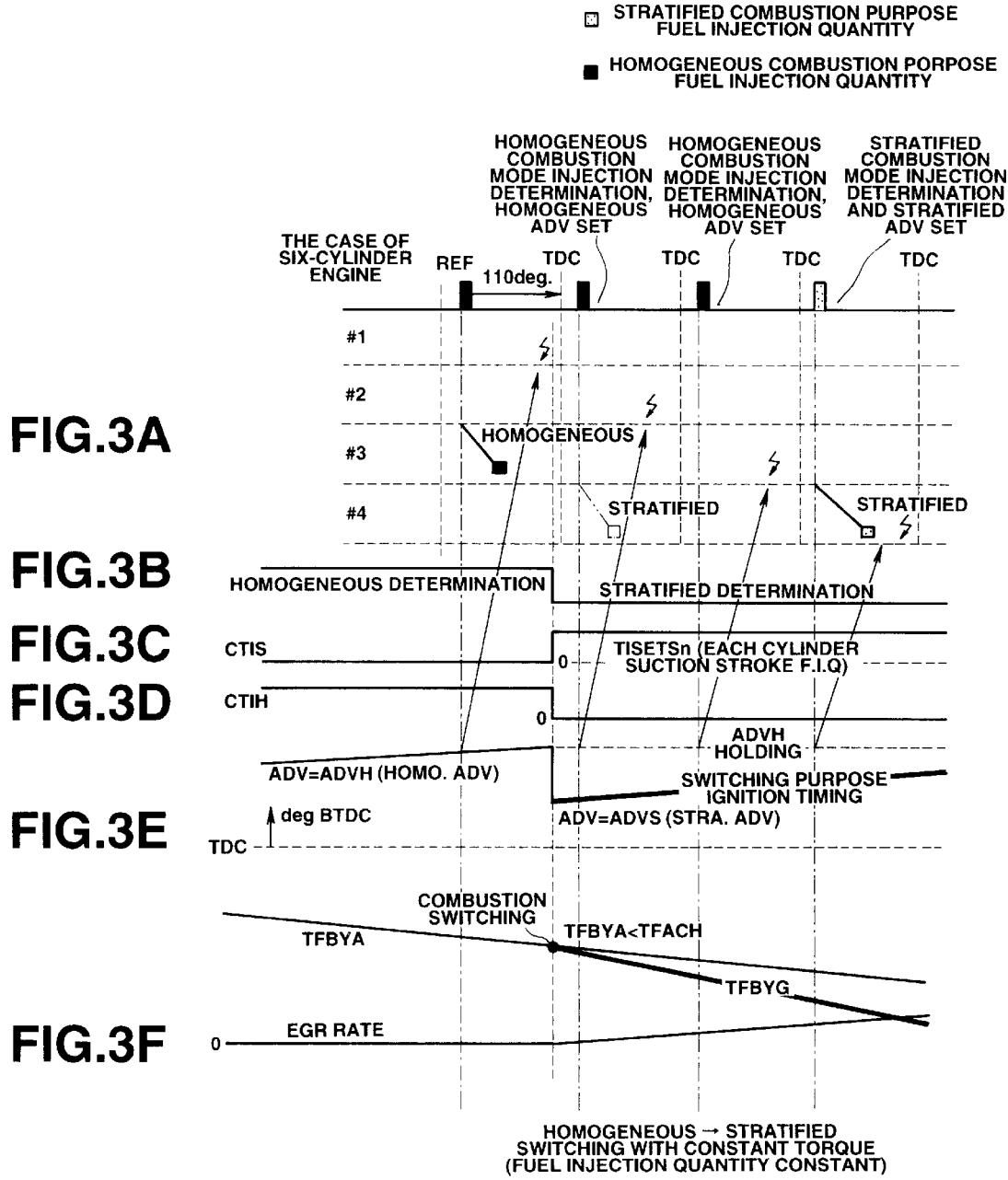

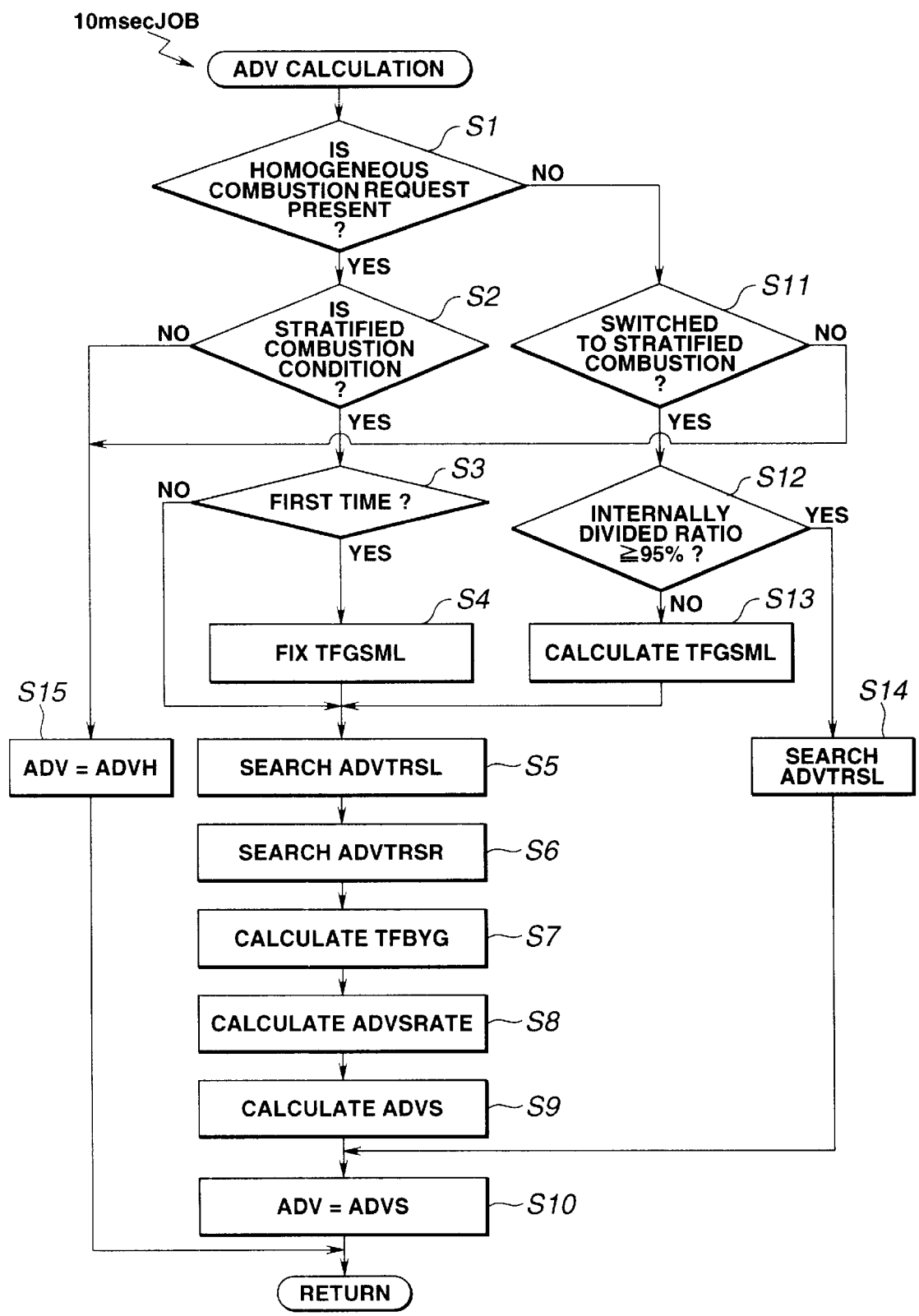

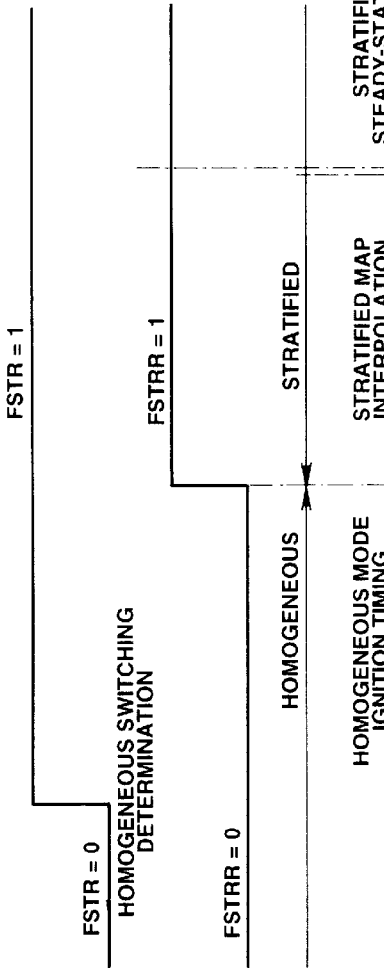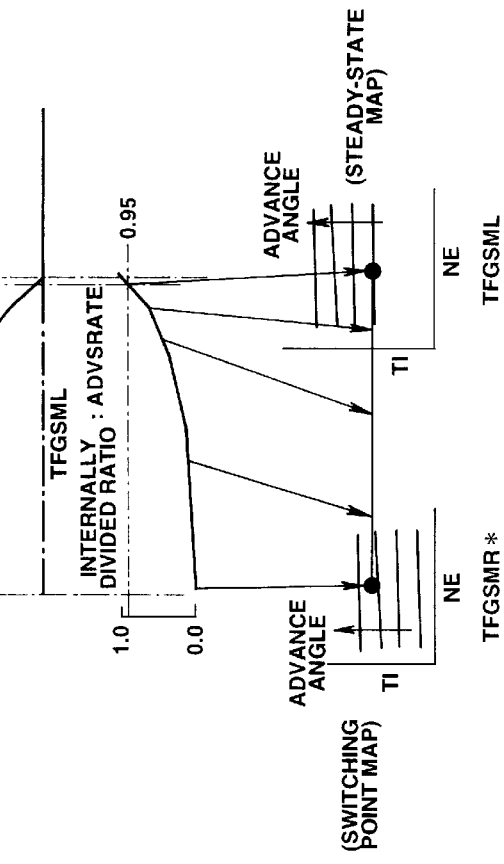
FIG.7A
FIG.7B
FIG.7C
FIG.7D
FIG.7E

IGNITION TIMING CONTROL APPARATUS AND METHOD FOR INTERNAL COMBUSTION ENGINE

The contents of the Application No. Heisei 9-194610, with a filing date of Jul. 18, 1997 in Japan, are herein incorporated by reference.

BACKGROUND OF THE INVENTION a) Field of the Invention

The present invention generally relates to control apparatus and method for an internal combustion engine and, more particularly, relates to ignition timing control apparatus and method for controlling an ignition timing of the internal combustion engine in a combustion mode of a stratified charge combustion during a transfer of a switching of the combustion mode between the stratified charge combustion and a homogeneous charge combustion according to an engine driving condition.

b) Description of the Related Art

A Japanese Patent Application First Publication No. Showa 59-37236 published on Feb. 29, 1984 exemplifies an internal combustion engine in which a fuel combustion mode is switched between a homogenous charge combustion mode in which a homogeneous air-fuel mixture is formed in each cylinder to perform a homogeneous charge combustion and a stratified charge combustion mode in which a rich air-fuel mixture is formed around each ignition plug to perform the stratified charge combustion according to an engine driving condition.

Another Japanese Patent Application First Publication No. Heisei 3-281965 published on Dec. 12, 1991 exemplifies a control apparatus for a two-cycle engine in which ignition timings for the engine in the homogeneous charge combustion and in the stratified charge combustion are set independently and separately from each other.

SUMMARY OF THE INVENTION

The ignition timing during the stratified charge combustion is set in such a way as to make a search for an ignition timing value from a map according to a present engine driving condition such as an engine speed and an engine load.

However, since such a map as described above is a look-up map only used in a steady state, when an equivalence ratio is gradually varied until it reaches to a switchable equivalence ratio when the switching is made between the stratified charge combustion and the homogenous charge combustion and the equivalence ratio moves between the steady state of the stratified charge combustion and a rich limit of an air-fuel mixture ratio, an appropriate setting of the ignition timing at this transfer state cannot be made.

That is to say, although the ignition timing searched from the map used in the steady state of the stratified charge combustion at the time of the stratified charge combustion is corrected in accordance with the variation in the equivalence ratio during the transfer of the combustion mode, the ignition timing at the rich combustion limit side is not determined so that a favorable correction of the ignition timing cannot easily be made.

In addition, although a type of the engine in which, during the stratified charge combustion, an EGR (Exhaust Gas Recirculation) is carried out, it is also necessary to set an EGR rate in the stratified charge combustion so as to gradually vary the EGR rate during the stratified charge combustion along with the variation in the equivalence ratio during the switching of the combustion mode (EGR rate approaches to zero as the air-fuel mixture ratio approached to the rich combustion limit). Consequently, it is also necessary to correct the ignition timing according to the EGR rate.

In this case, it takes a lot of time and labor cost to simultaneously correct the ignition timing in accordance with the variation in the equivalence ratio and in accordance with the EGR rate when both of the equivalence ratio and the EGR rate are varied.

It is therefore an object of the present invention to provide ignition timing control apparatus and method for an internal combustion engine which can appropriately control the ignition timing in the stratified charge combustion during a transfer of a switching of the combustion mode between the stratified charge combustion and the homogenous charge combustion and which can perform the ignition timing control with a high accuracy and with easiness even if the EGR rate is varied in parallel to the variation in the equivalence ratio in the stratified charge combustion during the transfer of the switching of the combustion mode from the stratified charge combustion into the homogeneous charge combustion and vice versa.

According to one aspect of the present invention, there is provided with an apparatus for an internal combustion engine, comprising: a) a first memory for storing at least one first ignition timing map used when a combustion mode of the engine is in a steady state of a stratified charge combustion; b) a second memory for storing a second ignition timing map corresponding to the stratified charge combustion carried out at a rich limit of an air-fuel mixture ratio of an air-fuel mixture supplied into each cylinder of the engine and which is used when the combustion mode of the engine is transferred at a switching point between the stratified charge combustion and a homogeneous charge combustion; c) an ignition timing generator for generating a an ignition timing value in the combustion mode of the stratified charge combustion of the engine during a transfer of a switching of the combustion mode of the engine between the stratified charge combustion and the homogeneous charge combustion using both of the first ignition timing map and the second ignition timing map; and d) an ignition device for igniting the air-fuel mixture supplied into each engine cylinder at a point of time corresponding to the ignition timing value generated by the ignition timing generator during the transfer of the switching of the combustion mode of the engine between the stratified charge combustion and the homogeneous charge combustion.

According to another aspect of the present invention, there is provided with a method for an internal combustion engine, the method comprising the steps of: a) storing at least one first ignition timing map used when a combustion mode of the engine is in a steady state of a stratified charge combustion; b) storing a second ignition timing map corresponding to the stratified charge combustion carried out at a rich limit of an air-fuel mixture ratio of an air-fuel mixture supplied into each cylinder of the engine and which is used when the combustion mode of the engine is transferred at a switching point between the stratified charge combustion and the homogeneous charge combustion; c) generating an ignition timing value in the combustion mode of the stratified charge combustion of the engine during a transfer of a switching of the combustion mode of the engine between the stratified charge combustion and the homogeneous charge combustion using both of the first ignition timing map and the second ignition timing map; and d) igniting the air-fuel mixture supplied into each engine cylinder at a point of time corresponding to the ignition timing value generated by the ignition timing generator during the transfer of the switching of the combustion mode of the engine between the stratified charge combustion and the homogeneous charge combustion.

This summary of the invention does not necessarily describe all necessary features so that the present invention may also be a sub-combination of these described features.

BRIEF DESCRIPTION OF THE DRAWINGS

FIGS. 2A, 2B, 2C, 2D, 2E, and 2F are integrally a timing chart of various types of status variables when a combustion mode of the engine shown in FIG. 1A is switched from a stratified charge combustion into a homogeneous charge combustion.

FIGS. 3A, 3B, 3C, 3D, 3E, and 3F are integrally a timing chart of the various types of status variables when the combustion mode of the engine shown in FIG. 1A is switched from the homogeneous charge combustion into the stratified charge combustion.

FIG. 4 is an operational flowchart executed by the controller for explaining a generation of an ignition timing in the controller shown in FIG. 1A.

FIGS. 7A, 7B, 7C, 7D, and 7E are integrally a timing chart representing the interpolation calculation executed in the controller shown in FIG. 1A during the transfer of the switching of the combustion mode of the engine shown in FIG. 1A from the homogeneous charge combustion into the stratified charge combustion.

BEST MODE FOR CARRYING OUT THE INVENTION

Reference will hereinafter be made to the drawings in order to facilitate a better understanding of the present invention.

Figure 1A:
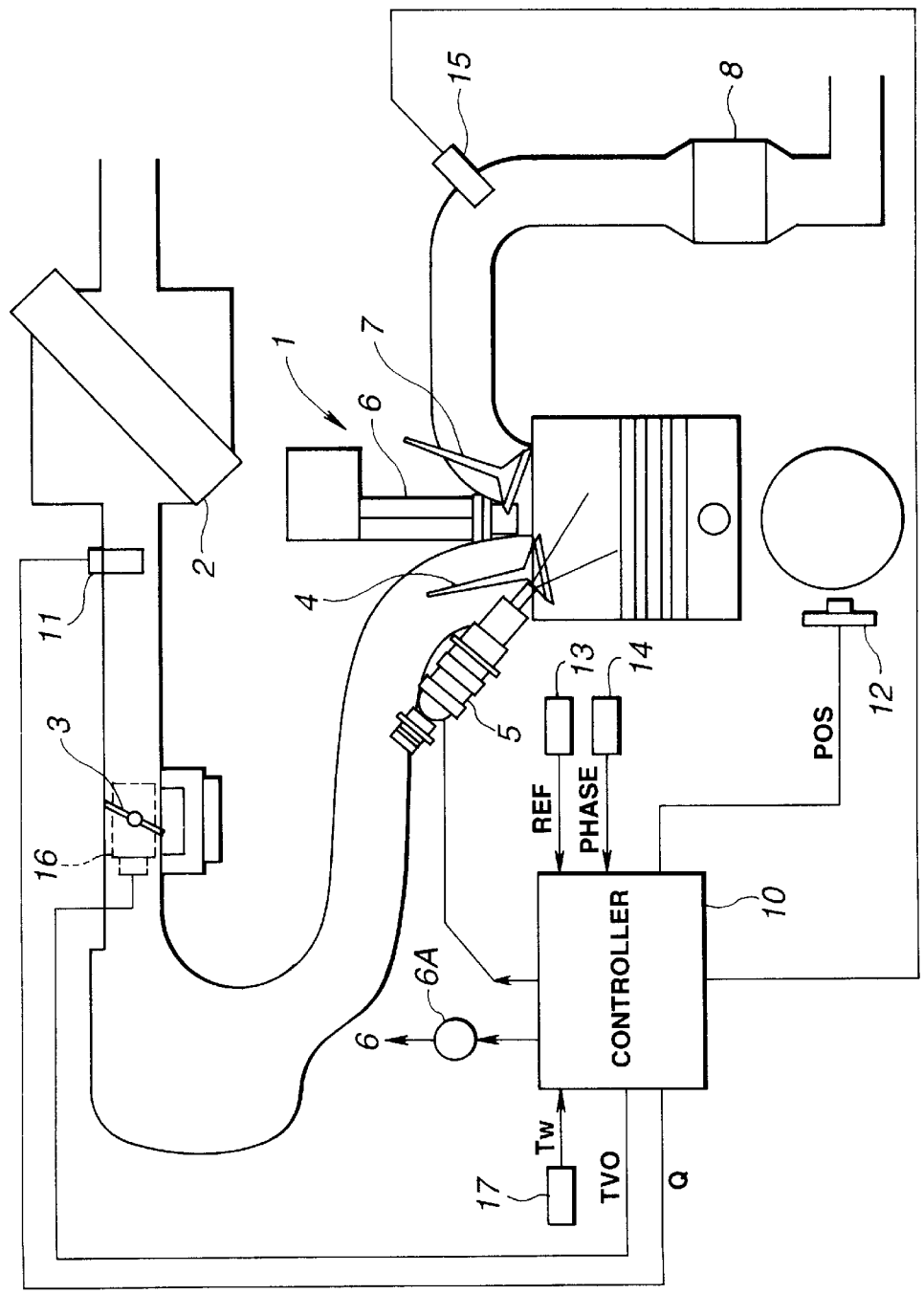
FIG. 1A is a schematic view of an ignition timing control apparatus for an internal combustion engine in a preferred embodiment according to the present invention.

FIG. 1A shows a system configuration of an internal combustion engine to which an ignition timing control apparatus in a preferred embodiment according to the present invention is applicable.

In the internal combustion engine 1 of FIG. 1A, an external air passed through an air cleaner 2 is adjusted through a throttle valve 3 and sucked into each cylinder via a suction valve 4.

In each cylinder of the engine 1, an electromagnetic type fuel injection valve 5 which directly injects fuel into a combustion chamber of each cylinder is disposed and an air-fuel mixture is formed by the injected fuel within the corresponding combustion chamber of each cylinder.

That is to say, the internal combustion engine 1 in the preferred embodiment is, so-called, a fuel direct injection type internal combustion engine (or in-cylinder fuel injection internal combustion engine).

The air-fuel mixture within each cylinder is ignited and burned through a spark ignition by means of a corresponding spark plug 6 and the combusted gas, i.e., an exhaust gas is exhausted via an exhaust valve 7, is purified through a catalytic converter 8, and is discharged in the air.

Figure 1B:
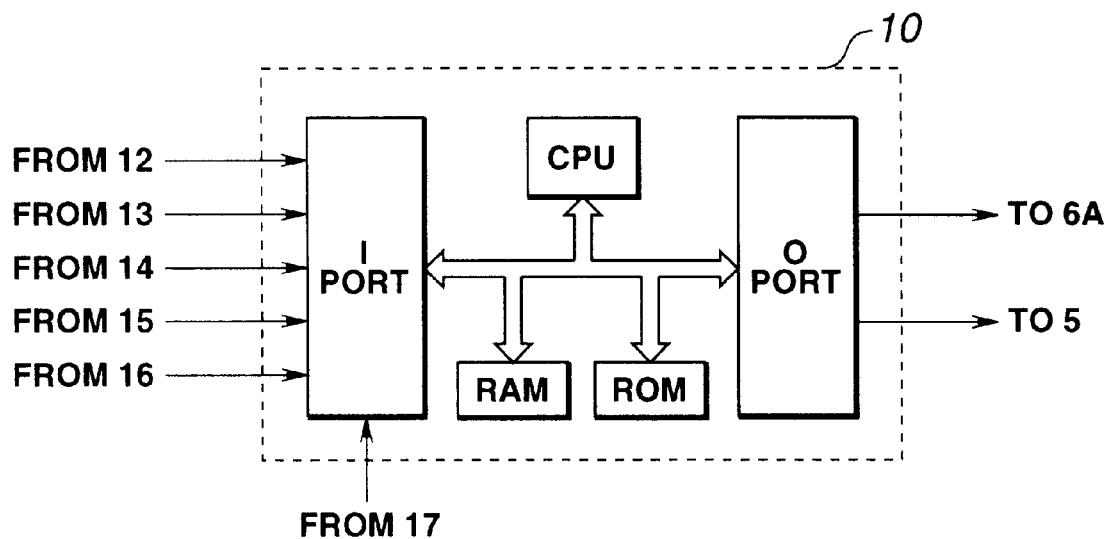
FIG. 1B is a schematic circuit block diagram of a controller shown in FIG. 1A.

A controller 10 having a microcomputer shown in FIG. 1B outputs respective control signals to the individual fuel injection valves 5 and to the individual spark plugs 6 to control fuel injection quantity and start timing and to control ignition timing (a power is supplied to each ignition coil (not shown) associated with the corresponding one of the spark plugs 6). The ignition coils and the spark plugs 6 constitute an ignition device.

The microcomputer of the controller 10 includes a CPU (Central Processing Unit), ROM (Read Only Memory), RAM (Random Access Memory), an Input Port, an Output Port, and a common bus, as shown in FIG. 1B.

The controller 10 receives various input signals from various types of sensors.

The various types of the sensors include: an airflow meter 11 for detecting an intake air quantity Q of the internal combustion engine 1; a position sensor 12 for outputting a detection signal (position signal POS) whenever a unit crank signal (for example, 1°) is revolved; a reference sensor for outputting a detection signal (a reference signal REF) whenever a crankshaft of the engine is revolved through a reference crank angular position of each cylinder; a phase sensor 14 for outputting a phase signal for discriminating a cylinder between each reference signal REF from the reference sensor 13; an air-fuel mixture ratio sensor 15 for detecting an air-fuel mixture ratio in response to an oxygen concentration in the exhaust gas; a throttle sensor 16 for detecting an opening angle TVO of the throttle valve 3; and a coolant temperature sensor 17 for detecting a temperature Tw of a coolant of the engine 1.

The controller 10 can determine an engine speed NE by measuring a generation period of the reference signal REF from the reference sensor 13 or by measuring the number of times the position signal POS are generated within a predetermined time.

The controller 10 includes, for example, a plurality of target equivalence ratio maps which previously set target equivalence ratios and combustion modes according to an engine driving condition such as an engine output torque and an engine speed.

The controller 10 selectively switches the plurality of target equivalence ratio maps according to an engine and vehicular driving condition such as the coolant temperature, a time duration after an engine start, a vehicle speed, and a vehicular acceleration and refers to the selected target equivalence ratio map to determine the target equivalence ratio (hereinafter, also referred to as TFBY00) and a request of switching the combustion mode of the engine 1.

Furthermore, the controller 10 provides a first-order lag for the target equivalence ratio derived from the selected one of the target equivalence ratio maps to derive a new target equivalence ratio (TFBYA) used for the calculation of an actual fuel injection quantity through each fuel injection valve 5 and is so arranged and constructed as to execute a switching of the combustion mode when the new target equivalence ratio (TFGYA) transverses a threshold value (TFACH) for determination of the switching in the combustion mode into a stratified charge combustion (refer to FIGS. 2A through 2F and 3A through 3F).

The reason that the first-order lag is provided for the target equivalence ratio (TFBYA00) is as follows: Since a delay in an intake air quantity occurs even if an opening angle of the throttle valve 3 is controlled so as to correspond to the target equivalence ratio (TFBYA00) derived through the selected target equivalence ratio map, the engine torque can be held to be constant to match with a phase of the intake air quantity and it is necessary to change the combustion mode between the stratified charge combustion and a homogeneous charge combustion with a common combustion equivalence ratio transiently determined, thus the new target equivalence ratio (TFGYA) being varied up to the combustible equivalence ratio.

Hence, the threshold valve (TFACH) for the combustion mode switching determination is not within a region in which the combustible equivalence ratio ranges in the respective combustion modes are overlapped (air-fuel mixture ratio ranges from about 20 to about 30).

In addition, in order to avoid a development in a torque stepwise difference during the change in the combustion modes, the new target equivalence ratio (TFGYA) may be changed in the stepwise manner during the switching determination.

The two combustion modes are set, viz., the homogeneous charge combustion mode in which the fuel is injected during each suction stroke to diffuse the fuel so that a homogeneous charge air-fuel mixture is formed within each cylinder to undergo a homogeneous charge combustion and the stratified charge combustion mode in which the fuel is injected during each compression stroke to perform a stratified charge so as to form a rich air-fuel mixture around the corresponding spark plug 6, thus the stratified charge combustion being carried out.

In the example shown in FIG. 2A, when the controller 10 determines a switching of the combustion mode from the stratified charge combustion into the homogeneous charge combustion on the basis of a comparison between the new target equivalence ratio (TFGYA) for which the first-order lag is provided and the threshold value (TFACH), the fuel injection at the time of the stratified charge combustion has already been set for a second cylinder #2. In addition, since, for a third cylinder #3, the set of the fuel injection at the time of the homogeneous charge combustion is not in time, the third cylinder #3 performs continuously the stratified charge combustion. However, since, for a fourth cylinder #4, the fuel injection at the timing of fuel injection in the homogeneous charge combustion is enabled to be carried out, the combustion mode is transferred to the homogeneous charge combustion, starting at the fourth cylinder #4. It is noted that the engine 1 shown in FIG. 1A is a six-cylinder four stroke engine.

In the example of FIG. 3A, when the controller 10 determines the switching of the combustion mode from the homogeneous charge combustion to the stratified charge combustion on the basis of the new target equivalence ratio, the fuel injection at the time of the homogeneous charge combustion is cancelled so that the fuel injection is retarded at the time of a more delayed stratified charge combustion and the combustion mode is transferred to the stratified charge combustion, starting at the fourth cylinder #4.

Figure 5:
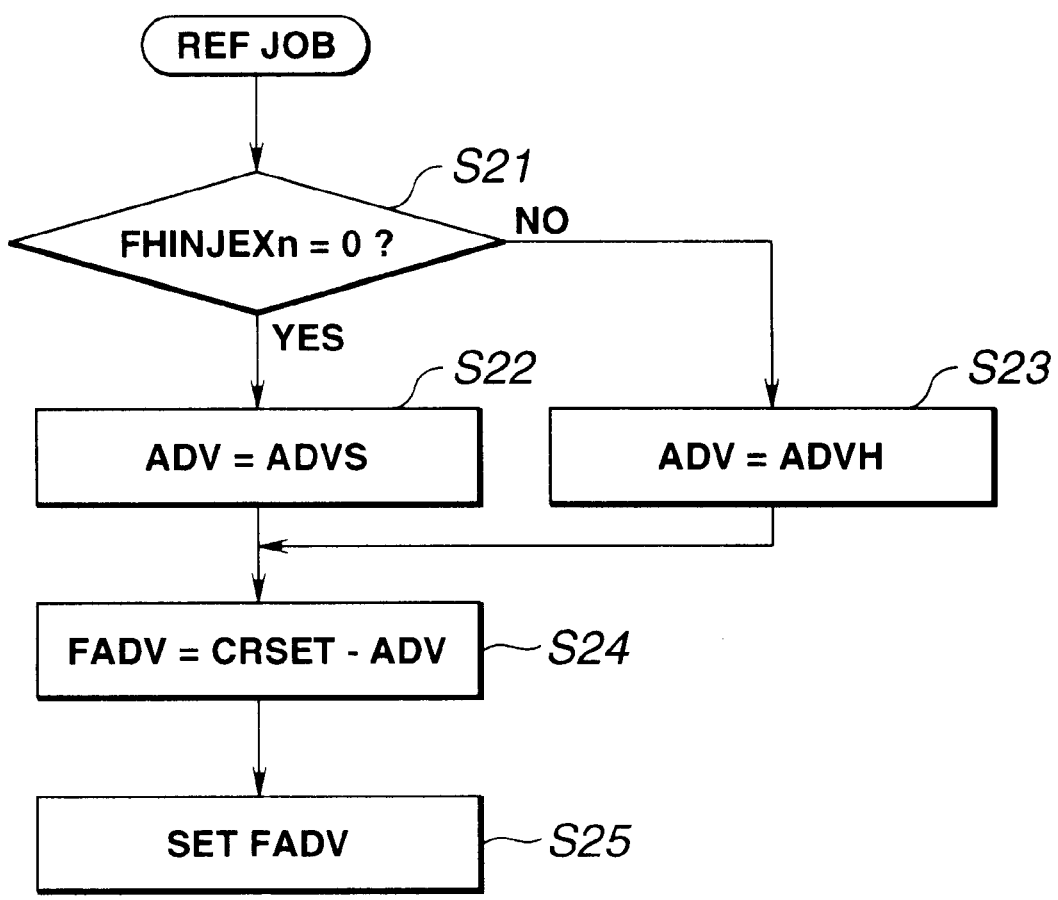
FIG. 5 is an operational flowchart executed by the controller for explaining a power supply control in an ignition coil of an ignition device for each cylinder of the engine shown in FIG. 1A.

The controller 10 carries out the ignition timing control in accordance with flowcharts shown in FIGS. 4 and 5.

FIG. 4 shows an ignition timing setting routine executed by the controller 10 shown in FIG. 1A whenever 10 milliseconds has passed.

At a step S1, the CPU of the controller 10 determines whether the present engine driving condition requests the engine 1 to be in the homogeneous combustion, specially, determines whether the present combustion mode is requested to be switched from the stratified charge combustion into the homogeneous charge combustion depending upon a value of a request combustion flag FSTR set on the basis of the selected one of the target equivalence ratio maps described above since the selected target equivalence ratio map indicates the combustion mode to be requested.

If the homogeneous charge combustion is requested (YES) at the step S1 (FSTR=1), the routine goes to a step S2.

At the step S2, the CPU of the controller 10 determines whether such a condition that the actual combustion is in the stratified charge combustion is satisfied, viz, determines whether such a condition that the combustion mode of the engine 1 is enabled to be switched into the homogeneous charge combustion is satisfied.

Actually, the CPU of the controller 10 compares the new target equivalence ratio TFBYA provided with the first-order lag with the threshold value TFACH for the determination of switching of the combustion mode into the stratified charge combustion and determines whether TFBYA<TFACH.

Then, if TFBYA<TFACH, the CPU of the controller 10 determines that the condition such that the actual combustion is enabled to be switched from the stratified charge combustion into the homogeneous charge combustion is satisfied and sets a flag FSTRR indicating a determination of the switching from the stratified charge combustion to the homogeneous charge combustion to "1".

If TFBYA≦TFACH (NO) at the step S2, the CPU of the controller 10 resets the flag FSTRR to "0". Thereafter, the CPU of the controller 10 refers to the status of the flag FSTRR. That is to say, the CPU of the controller 10 determines the satisfaction of the condition such that the actual combustion is enabled to be switched from the stratified charge combustion to the homogeneous charge combustion depending upon the status of the flag FSTRR.

If the CPU of the controller 10 determines that the switching determination from the stratified charge combustion into the homogeneous charge combustion has been made at the step S2, the routine goes to a step S3.

At the step S3, the CPU of the controller 10 determines whether this series of determination is the first time, namely, it is the immediate after the switching request of the combustion mode from the stratified charge combustion to the homogeneous charge combustion occurs on the basis of the above-described target equivalence ratio maps.

If the CPU of the controller 10 determines that it is the immediate after the switching request described above has occurred (YES) at the step S3, the routine goes to a step S4.

A status variable TFBYG of the air-fuel mixture at the time of the switching request is calculated using the following equation (1).

After the calculated value of TFBYG is fixed as TFGSML, the routine goes to a step S5.

After the second time or more occurs upon the request of switching, the routine of FIG. 4 executed by the CPU of the controller 10 jumps over the step S4 to the step S5.

$$TFBYG=TFBYA/(1+EGR\ rate) \quad (1).$$

If the status variable TFBYG of the air-fuel mixture becomes coincident with the equivalence ratio when EGR rate=0, the equivalence ratio represents a value of a ratio of the fixed quantity with respect to the external air (accurately, a value of the above-described ratio divided by a stoichiometric air-fuel mixture ratio).

In the equation (1), TFBYG is a value of the ratio of the fuel quantity with respect to an operating gas of the external air to which an EGR gas is added together with the fresh air (accurately, a value of the above-described 15 ratio divided by the stoichiometric air-fuel mixture ratio). Hence, TFBYG is also referred to as an operating gas equivalence ratio.

The external air is an air supplied externally through the air cleaner 2.

At a step S5, the CPU of the controller 10 searches the ignition timing (in an advance angle of degree) ADVTRSL from among the steady-state purpose ignition timing maps ADVTRSL as the function of both engine speed NE and an engine load such as the fuel injection quantity Ti.

It is noted that the steady-state purpose ignition timing maps ADVTRSL are plural, the ignition timing values (advance angle) arrayed in the respective maps ADVTRSL being also varied according to the set EGR rate as well as the engine speed NE and the engine load Ti.

It is also noted that the steady-state purpose ignition timing maps ADVTRSL may be a three-dimensional map in which the ignition timing values are arrayed three-dimensionally according to the engine speed NE, the engine load Ti, and the set EGR rate.

Hence, the CPU of the controller 10 searches for the ignition timing MADVTRSL from among the maps ADVTRSL as the function of the presently set EGR rate in addition to the engine speed Ne and the fuel injection quantity Ti.

It is noted that the ignition timing maps ADVTRSR for the switching point purpose is set so as to correspond to the stratified charge combustion at the air-fuel mixture ratio immediately before the actual combustion mode is switched from the stratified charge combustion into the homogeneous charge combustion.

At a step S6, the CPU of the controller 10 searches for the ignition timing MADVTRSR from the ignition timing map ADTRSR for the switching point purpose as the function of the engine speed NE and the engine load such as the fuel injection quantity Ti.

It is noted that the ignition timing map ADVTRSR for the switching point purpose is prepared so as to correspond to the stratified charge combustion at a rich limit (richest point) of the air-fuel mixture ratio immediately before the actual combustion is switched into the homogeneous charge combustion and is set under a condition of no execution of EGR (EGR rate=0).

Next, at a step S7, the CPU of the controller 10 calculates the operating gas equivalence ratio TFBYG under the present engine driving condition according to the equation (1) described above.

As shown in FIG. 2F, the EGR rate is decreased as the equivalence ratio is varied to the richer side and is reached to zero when the air-fuel mixture ratio is reached to the rich limit (although the EGR rate often does not indicate zero).

At a step S8, the CPU of the controller 10 calculates an internally divided ratio ADVSRATE of the operating gas equivalence ratio TFBYG used to calculate an interpolation of the ignition timing values searched from the above-mentioned two maps as follows:

$$ADVSRATE=(TFBYG-TFGSMR)/(TFGSML-TFGSMR) \quad (2).$$

In the equation (2), TFBYG denotes the present operating gas equivalence ratio calculated at the step S7, TFGSML denotes the operating gas equivalence ratio at the time of the steady state stratified charge combustion immediately before the occurrence of the request of switching of the combustion mode fixed and calculated at the step S2, and TFGSMR denotes the operating gas equivalence ratio under the air-fuel mixture ratio rich limit in the stratified charge combustion corresponding to the ignition timing map for the switching point purpose.

It is noted that the equivalence ratio at the switching point corresponds to the threshold value TFACH used for the determination of the switching of the combustion mode, and the ignition timing map MADVTRSR is set under the condition of the no execution of EGR (EGR rate=0), and TFGSMR is a fixed value equal to the threshold value TFACH.

At a step S9, the CPU of the controller 10 calculates the ignition timing ADVS at the time of the stratified charge combustion during the transfer of switching of the combustion mode from the stratified charge combustion into the homogeneous charge combustion using the interpolation shown in the following equation on the basis of the internally divided ratio ADVSRATE and searched values MADVTRSL and MADVTRSR from the two maps used for the steady-state purposed and for the switching point purpose:

$$ADVS=(MADVTRSL-MADVTRSR) \times ADVSRATE+MADVTRSR.$$

At a step S10, the ignition timing ADVS calculated at the step S9 is set as the ignition timing ADV at the stratified charge combustion during the transfer of the switching from the stratified charge combustion into the homogeneous charge combustion.

FIGS. 6A through 6D show control situations at the time of derivation of the ignition timing ADV when the combustion mode of the engine 1 is switched from the stratified charge combustion into the homogeneous charge combustion.

As shown in FIGS. 6A through 6D, the ignition timing ADVS at the stratified charge combustion during the switching of the combustion mode can be set by the ignition timings MADVTRSL searched from the maps used for the steady-state purpose and MADVTRSR searched from the map for the switching point purpose according to the internally divided ratio ADVSRATE which is varied according to the variation in the operating gas equivalence ratio TFBYG.

In addition, when the request of switching from the stratified charge combustion into the homogeneous charge combustion is absent at the step S1 and, conversely, the request of the switching from the homogeneous charge combustion into the stratified charge combustion is present at the same step S1 (NO), the routine goes to a step S11 in which the CPU of the controller 10 determines whether the determination of the switching from the homogeneous charge combustion to the stratified charge combustion has been made.

If the CPU of the controller 10 determines that the determination of the switching to the stratified charge combustion has been made (YES) at the step S11, the routine goes to a step S12.

At the step S12, the CPU of the controller 10 determines whether the latest internally divided ratio ADVSRATE calculated at the previous step S8 gives a predetermined value (for example, 95%) or more near to 1.

If the CPU of the controller 10 determines that the internally divided ratio ADVSRATE is below the predetermined value(NO) at the step S12, the CPU controller 10 determines that the present situation is in a midway through the transfer of the combustion mode to the steady state of the stratified charge combustion upon the determination of the switching to the stratified charge combustion after the receipt of the switching of the combustion mode from the homogeneous charge combustion to the stratified charge combustion and the routine goes to a step S13.

At the step S13, the CPU of the controller 10 calculates the operating gas equivalence ratio TFGSML (fixed TFGYB) according to the stratified charge combustion after the combustion state is converged to the steady state.

The operating gas equivalence ratio TFGSML (or referred to as TFGYB at TFGSML) calculated at the step S13 is derived using the equation (1) from the above-described target equivalence ratio (TFBYA00) and the target EGR rate set from the selected target equivalence ratio map according to the present engine operating condition (namely, TFGYB at TFGSML=TFBYA00/(1+set target EGR rate).

Next, the routine goes from the step S13 to the step S5.

Finally, at the steps S5 to S10, the same interpolation as described above is carried out to derive the ignition timing ADVS at the stratified combustion during the transfer of the switching of the combustion mode from the homogeneous charge combustion to the stratified charge combustion and the calculated ignition timing of ADVS is assigned to the ignition timing ADV (ADV=ADVS).

FIGS. 7A through 7E show the situations of the engine operation when the combustion mode is switched from the homogeneous charge combustion to the stratified charge combustion.

Until the internally divided ratio ADVSRATE gives the predetermined value ($\geq 95\%$), the ignition timing TFGSMR searched from the map for the switching purpose and the ignition timing TFGSML searched from one of the maps for the steady state purpose are used to calculate the interpolation according to the internally divided ratio ADVSRATE which is varied according to the operating gas equivalence ratio TFBYG as follows: ADVS=(TFGSML−TFGSMR)× ADVSRATE+TFGSMR.

Consequently, the ignition timing ADVS at the mode of the stratified charge combustion during the transfer of the switching of the combustion mode from the homogeneous charge combustion into the stratified charge combustion can be set.

As described above, a highly accurate ignition timing control can be achieved using the interpolation based on the variation rate in the operating gas equivalence ratio TFBYG according to the equivalence ratio and EGR rate at the stratified charge combustion during the transfer of the switching of the combustion mode from the stratified charge combustion to the homogeneous charge combustion and vice versa.

Especially, the ignition timing is linearly varied according to the variation in the equivalence ratio and is linearly varied according to the variation in the EGR rate although a sensitivity thereof with respect to the variation in the EGR rate is different from that with respect to the variation in the equivalence ratio.

Hence, the ignition timing can be managed by a single value of the operating gas equivalence ratio TFBYG with both of the equivalence ratio and the EGR rate taken into consideration.

Since, with these matters in mind, the operating gas equivalence ratio TFBYG is used only when the transfer of the switching of the combustion mode occurs, an optimum ignition timing control can be achieved with the difference in the sensitivity described above reduced.

Referring back to FIG. 4, at the step S12, when the internally divided ratio ADVSRATE is determined to be equal to or higher than the predetermined value (95%), the CPU of the controller 10 determines that the present combustion mode is in the steady state stratified combustion and the routine goes to a step S14.

At the step S14, the CPU of the controller 10 sets the ignition timing MADVTRSL searched from the ignition timing maps ADVTRSL for the steady state purpose as the ignition timing ADVS during the steady state stratified charge combustion.

On the other hand, if the CPU of the controller 10 determines that the present combustion mode is not enabled to be switched into the homogeneous charge combustion (NO) at the step S2, the routine goes to a step S15 in which the ignition timing ADVH for the homogeneous charge combustion is set as the ignition timing ADV (ADV=ADVH).

It is noted that although the ignition timing ADVH for the homogeneous charge combustion may be set from a corresponding map on the basis of the engine operating condition (engine speed and load) in the same way as the case of the stratified charge combustion, the ignition timing ADVH for the homogeneous charge combustion may be calculated so as to achieve an MBT (Minimum Spark Angle for Best Torque).

FIG. 5 shows an operational flowchart executed by the controller 10 to control a power supply of each ignition coil of the ignition device according to the ignition timing set as described above.

The routine of FIG. 5 is executed whenever each reference signal REF is inputted to the controller 10 as shown in FIG. 1A.

That is to say, at a step S21, the CPU of the controller 10 determines a fuel injection mode for any one of the cylinders which corresponds to the presently inputted reference signal REF on the basis of a value of a combustion mode determination flag FHINJEXn (n: cylinder number) for each cylinder.

The combustion mode determination flag FHINJEXn (n: cylinder) for each cylinder is set for each cylinder corresponding to n, the CPU of the controller 10 determining whether it is actually possible to change the combustion mode determined according to the determination of the switching of the combustion to the combustion mode.

At the step S21, if the CPU of the controller 10 determines the stratified combustion (YES), the routine goes to a step S22 in which the ignition timing ADV of the corresponding one of the cylinders described above is set to the latest set ignition timing ADVS for the stratified charge combustion (ADV=ADVS).

On the other hand, if the CPU of the controller 10 determines not the stratified charge combustion but the homogeneous charge combustion at the step S21 (NO), the routine goes to a step S23 in which the ignition timing ADV for the corresponding one of the cylinders is set to the latest set ignition timing ADVH for the homogeneous charge combustion (ADV=ADVH).

At the next step S24, a crank angular interval FACV for the presently inputted reference signal REF up to the ignition timing ADV (the advance angle value from a reference upper top dead center of a corresponding piston in °BTDC) is calculated as follows: FACV=CRSET−ADV.

It is noted that CRSET is an advance angle value from a reference upper top dead center of the reference signal.

At a step S25, the CPU of the controller 10 sets the value of FACV decrementally whenever the position signal POS is inputted.

When the counted value of FACV reaches to zero, the ignition is carried out through the spark plug 6 of the corresponding one of the cylinders.

Figures 6A, 6B, 6C, 6D:
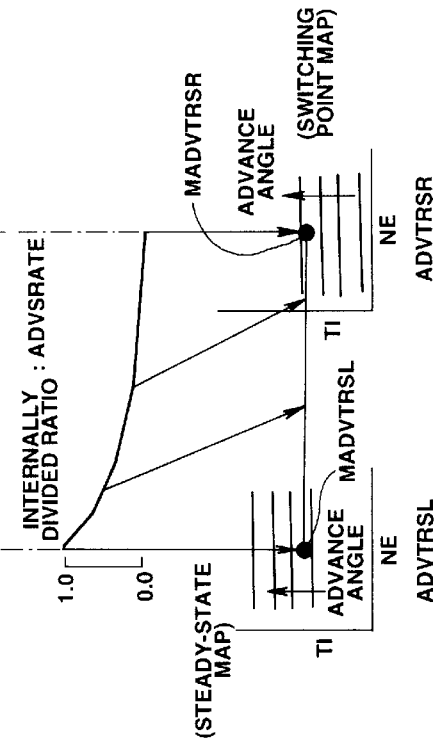
FIGS. 6A, 6B, 6C, and 6D are integrally a timing chart representing an interpolation calculation executed in the controller shown in FIG. 1A during a transfer of a switching of the combustion mode of the engine shown in FIG. 1A from the stratified charge combustion into the homogeneous charge combustion.

It is noted that the ignition timing maps for the steady state purpose and for the switching point purpose as shown in FIGS. 6D and 7E and the target equivalence ratio maps described above are stored in a memory such as ROM shown in FIG. 1A.

According to another aspect of the present invention, there is provided with an internal combustion engine which carries out a switching of a combustion mode between a stratified charge combustion and a homogeneous charge combustion according to an engine driving condition, the internal combustion engine comprising: a) first storing means for storing at least one first ignition timing map used when a combustion mode of the engine is in a steady state of the stratified charge combustion; b) second storing means for storing a second ignition timing map corresponding to the stratified charge combustion carried out at a rich limit of an air-fuel mixture ratio of an air-fuel mixture supplied into each cylinder of the engine and which is used when the combustion mode of the engine is transferred at a switching point between the stratified charge combustion and the homogeneous charge combustion; ignition timing generating means for generating an ignition timing value in the combustion mode of the stratified charge combustion of the engine during a transfer of a switching of the combustion mode of the engine between the stratified charge combustion and the homogeneous charge combustion using both of the first ignition timing map and the second ignition timing map; and d) ignition means for igniting the air-fuel mixture supplied into each engine cylinder at a point of time corresponding to the ignition timing value generated by the ignition timing generator during the transfer of the switching of the combustion mode of the engine between the stratified charge combustion and the homogeneous charge combustion.

What is claimed is:

1. An apparatus for an internal combustion engine, comprising:
    a) a first memory for storing at least one first ignition timing map used when a combustion mode of the engine is in a steady state of a stratified charge combustion;
    b) a second memory for storing a second ignition timing map corresponding to the stratified charge combustion carried out at a rich limit of an air-fuel mixture ratio of an air-fuel mixture supplied into each cylinder of the engine and which is used when the combustion mode of the engine is transferred at a switching point between the stratified charge combustion and a homogeneous charge combustion;
    c) an ignition timing generator for generating a an ignition timing value in the combustion mode of the stratified charge combustion of the engine during a transfer of a switching of the combustion mode of the engine between the stratified charge combustion and the homogeneous charge combustion using both of the first ignition timing map and the second ignition timing map; and
    d) an ignition device for igniting the air mixture fuel supplied into each engine cylinder at a point of time corresponding to the ignition timing value generated by the ignition timing generator during the transfer of the switching of the combustion mode of the engine between the stratified charge combustion and the homogeneous charge combustion.

2. An apparatus for an internal combustion engine as claimed in claim 1, wherein the ignition timing values arranged in both of the first and second ignition timing maps are generated in accordance with at least one common engine driving condition parameter.

3. An apparatus for an internal combustion engine as claimed in claim 1, which further comprises an engine driving condition detector for detecting an engine driving condition and wherein the ignition timing generator comprises: a) a first determinator for determining whether the combustion mode of the engine is requested to be switched into either the stratified charge combustion or the homogeneous charge combustion according to the detected engine driving condition; b) a second determinator for determining whether a condition such that the present combustion mode is enabled to be switched into the requested combustion mode is satisfied; c) a third determinator for determining a variation rate of a status variable of the air-fuel mixture supplied into each cylinder of the engine on the basis of the detected engine operating condition in response to the determination of the first determinator that the present combustion mode is requested to be switched into one of either the stratified charge combustion or the homogeneous charge combustion; and d) an ignition timing calculator for calculating the ignition timing in the mode of the stratified charge combustion during the transfer of the switching of the combustion mode between the stratified charge combustion and the homogeneous charge combustion through an interpolation based on the variation rate in the status variable of the air-fuel mixture between ignition timing values searched from the first ignition timing map and second ignition timing map for a time duration from a time at which the first determinator determines that the present combustion mode is requested to be switched into either the stratified charge combustion or the homogeneous charge combustion either to a time at which the combustion mode is actually switched into the requested combustion mode or to a predetermined time determined depending on into which of the combustion modes is requested to be switched.

4. An apparatus for an internal combustion engine as claimed in claim 3, which further comprises a third memory for storing a plurality of target equivalence ratio maps, each target equivalence ratio map representing a target equivalence ratio and the combustion mode corresponding to the target equivalence ratio previously set according to the engine driving condition, and a selector for selecting one of the target equivalence maps according to the detected engine driving condition and wherein the first determinator determines whether the present combustion mode is requested to be switched into one of either the stratified charge combustion or the homogeneous charge combustion according to which one of the target equivalence ratio maps is selected by the selector.

5. An apparatus for an internal combustion engine as claimed in claim 4, wherein the third determinator provides a first order lag for the target equivalence ratio derived from the selected target equivalence ratio map so as to determine a new target equivalence ratio (TFBYA) used for a calculation of a fuel injection quantity of a fuel supplied into each engine cylinder through a corresponding fuel injection valve of each cylinder and wherein the apparatus further comprises a fourth determinator for determining an operating gas equivalence ratio (TFBYG) as the variation rate in the status variable of the air-fuel mixture on the basis of the new target equivalence ratio (TFBYA) while the second determinator determines that the condition is satisfied after the first determinator determines that the present combustion mode of the engine is requested to be switched from the stratified charge combustion into the homogeneous charge combustion.

6. An apparatus for an internal combustion engine as claimed in claim 5, wherein the second determinator determines whether the condition is satisfied depending upon whether a value of the new target equivalence ratio (TFBYA) is lower than a threshold value (TFACH).

7. An apparatus for an internal combustion engine as claimed in claim 6, which further comprises an EGR calculator for calculating an EGR rate according to the detected engine driving condition and wherein the fourth determinator determines the operating gas equivalence ratio (TFBYG) as follows: TFBYG=TGBYA/(1+EGR rate).

8. An apparatus for an internal combustion engine as claimed in claim 7, wherein the engine driving condition determinator comprises an engine speed detector for detecting an engine speed detector for detecting an engine speed and an engine load detector for detecting an engine load and wherein the ignition timing generator searches the ignition timing value (MADVTRSL) from the first ignition timing map (ADVTRSL) according to the engine speed, the engine load, and the EGR rate and the ignition timing value (MADVTRSR) from the second ignition timing map (ADVTRSR) according to the same engine speed and same engine load, with the EGR rate being zeroed, when the second determinator determines that the condition such that the present combustion mode is enabled to be switched from the homogeneous charge combustion into the stratified charge combustion is satisfied.

9. An apparatus for an internal combustion engine as claimed in claim 8, wherein the ignition timing calculator comprises an internally divided ratio calculator for calculating an internally divided ratio (ADVSRATE) of the operating gas equivalence ratio (TFBYG) as follows:

ADVSRATE=(TFBYG−TFGSMR)/(TFGSML−TFGSMR), wherein TFGSML denotes the operating gas equivalence ratio in a steady state stratified charge combustion immediately before the first determinator determines that the present combustion mode is requested to be switched from the homogeneous charge combustion into the stratified charge combustion and TFGSMR denotes the operating gas equivalence ratio under the rich limit of the air-fuel mixture ratio of the air-fuel mixture in the mode of the stratified charge combustion corresponding to the second ignition timing map.

10. An apparatus for an internal combustion engine as claimed in claim 9, wherein the ignition timing (ADVS) in the mode of the stratified charge combustion for the time duration from the time at which the first determinator determines that the present combustion mode is requested to be switched from the stratified charge combustion into the homogeneous charge combustion to the time at which the combustion mode of the engine is actually switched from the stratified charge combustion into the homogeneous charge combustion is calculated as follows:

ADVS=(MADVTRSL−MADVTRSR)×ADVSRATE+MADVTRSR.

11. An apparatus for an internal combustion engine as claimed in claim 10, wherein the predetermined time is set on the basis of the variation rate in the status variable of the air-fuel mixture.

12. An apparatus for an internal combustion engine as claimed in claim 11, which further comprises a fifth determinator for determining whether the internally divided ratio (ADVSRATE) is below a predetermined value near to one when the second determinator determines that the condition is satisfied after the first determinator determines that the present combustion mode is requested to be switched from the homogeneous charge combustion into the stratified charge combustion.

13. An apparatus for an internal combustion engine as claimed in claim 12, wherein the predetermined value is approximately 95%.

14. An apparatus for an internal combustion engine as claimed in claim 12, wherein the ignition timing calculator calculates the ignition timing (ADVS) as follows while the fifth determinator determines that the internally divided ratio (ADVSRATE) based on the target equivalence ratio (TFBYG at TFGSML) is below the predetermined value and up to a time at which the internally divided ratio has reached to the predetermined value; ADVS=(MADVTRSL−MADVTRSR)×ADVSRATE+MADVTRSR, wherein MADVTRSL corresponds to the ignition timing value TFGSML searched from the first ignition timing map and MADVTRSR corresponds to the ignition timing value TFGSMR searched from the second ignition timing map.

15. An apparatus for an internal combustion engine as claimed in claim 14, wherein when the fifth determinator determines that the internally divided ratio (ADVSTRATE) is equal to or greater than the predetermined value, the ignition timing generator generates the ignition timing (ADVS) in the steady-state stratified charge combustion from the ignition timing value (MADVTRSL) searched from the first ignition timing map (ADVTRSL).

16. An apparatus for an internal combustion engine as claimed in claim 14, which further comprises a reference signal generator for generating a reference signal (REF) whenever an engine crankshaft is revolved through a reference crank angular position; a sixth determinator for determining whether the combustion mode of any one of the engine cylinders of which the reference signal is presently inputted thereto is enabled to be switched into either the stratified charge combustion or the homogeneous charge combustion; a crank angle calculator for calculating a crank angular interval from the corresponding reference signal (REF) to the finally determined ignition timing value (ADV) determined depending upon into which combustion mode of the corresponding one of the engine cylinders is switched as follows: FACV=CRESET−ADV, wherein CRSET is an advance angle value of the reference signal (REF) from a reference upper top dead center of a piston of the corresponding one of the engine cylinders; and a counter for counting decrementally the value of FACV to zero and wherein the ignition device ignites the air mixture fuel supplied into the corresponding one of the engine cylinders at the time when the counter indicates zero.

17. An apparatus for an internal combustion engine as claimed in claim 14, wherein the EGR rate is reduced at a decreasing rate to reach to zero for the time duration from the time at which the first determinator determines that the present combustion mode is requested to be switched from the stratified charge combustion mode into the homogeneous charge combustion to the time at which the combustion mode of any one of the engine cylinders is actually switched from the stratified charge combustion into the homogeneous charge combustion.

18. An apparatus as claimed in claim 17, wherein the EGR rate is increased from zero at an increasing rate for the time duration from the time at which the first determinator determines that the present combustion mode of each cylinder is requested to be switched from the homogeneous charge combustion into the stratified charge combustion.

19. An internal combustion engine which carries out a switching of a combustion mode between a stratified charge combustion and a homogeneous charge combustion according to an engine driving condition, the internal combustion engine comprising:

a) first storing means for storing at least one first ignition timing map used when a combustion mode of the engine is in a steady state of the stratified charge combustion;

b) second storing means for storing a second ignition timing map corresponding to the stratified charge combustion carried out at a rich limit of an air-fuel mixture ratio of an air-fuel mixture supplied into each cylinder of the engine and which is used when the combustion mode of the engine is transferred at a switching point between the stratified charge combustion and the homogeneous charge combustion;

d) ignition timing generating means for generating an ignition timing value in the combustion mode of the stratified charge combustion of the engine during a transfer of a switching of the combustion mode of the engine between the stratified charge combustion and the homogeneous charge combustion using both of the first ignition timing map and the second ignition timing map; and d) ignition means for igniting the air-fuel mixture supplied into each engine cylinder at a point of time corresponding to the ignition timing value generated by the ignition timing generator during the transfer of the switching of the combustion mode of the engine between the stratified charge combustion and the homogeneous charge combustion.

20. A method for an internal combustion engine, the method comprising the steps of:

a) storing at least one first ignition timing map used when a combustion mode of the engine is in a steady state of a stratified charge combustion;

b) storing a second ignition timing map corresponding to the stratified charge combustion carried out at a rich limit of an air-fuel mixture ratio of an air-fuel mixture supplied into each cylinder of the engine and which is used when the combustion mode of the engine is transferred at a switching point between the stratified charge combustion and the homogeneous charge combustion;

c) generating an ignition timing value in the combustion mode of the stratified charge combustion of the engine during a transfer of a switching of the combustion mode of the engine between the stratified charge combustion and the homogeneous charge combustion using both of the first ignition timing map and the second ignition timing map; and d) igniting the air-fuel mixture supplied into each engine cylinder at a point of time corresponding to the ignition timing value generated by the ignition timing generator during the transfer of the switching of the combustion mode of the engine between the stratified charge combustion and the homogeneous charge combustion.

* * * * *